(No Model.)
G. E. PAINTER.
FLY FAN.
No. 588,754.                    Patented Aug. 24, 1897.
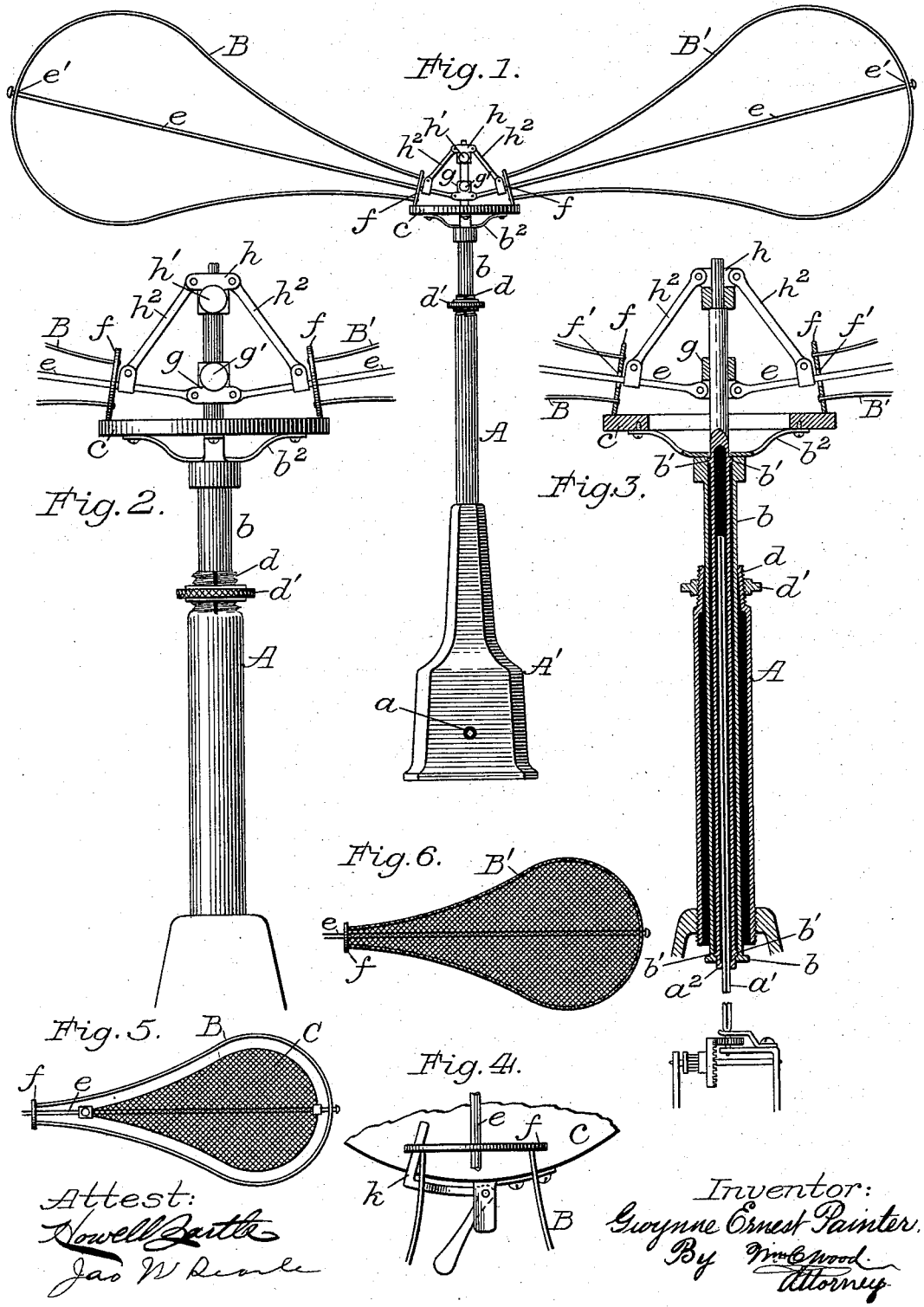

UNITED STATES PATENT OFFICE.

GWYNNE ERNEST PAINTER, OF BALTIMORE, MARYLAND, ASSIGNOR TO WILLIAM A. PLEASANTS, OF SAME PLACE.

FLY-FAN.

SPECIFICATION forming part of Letters Patent No. 588,754, dated August 24, 1897.

Application filed June 5, 1897. Serial No. 639,601. (No model.)

*To all whom it may concern:*

Be it known that I, GWYNNE ERNEST PAINTER, of the city of Baltimore, in the State of Maryland, have invented certain new and useful Improvements in Fly-Fans; and I do hereby declare that the following specification, taken in connection with the drawings furnished and forming a part of the same, is a clear, true, and complete description of my invention.

My said improvements relate to that class of fly-fans wherein the two or more fan-blades while being carried in a circular path are each also revolved axially. In all prior fans of this class known to me the fan-blades are carried on and locked to radial shafts to which power is applied for axially revolving them.

One object of my invention is to economize in the expenditure of power, this being specially important when spring-motors are employed, and to that end I employ radial arms upon which the fan-blades are axially mounted and so apply the power to the fan-blades that they are revolved upon said arms while the latter are moving with the blades in their circular path. The power required for thus driving the fans is much less than when the revolving fan-shafts are employed. For reducing to a minimum the frictional bearing of each fan-blade it is axially supported upon the arm at but one point, at or near its outer end, the inner end of the blade being axially supported independently of said arm by a drive-wheel which rides upon a stationary annular drive-plate from which power is communicated when the arms and fan-blades are being driven in their circular path.

The main feature of my invention enables me to organize with each radial arm one flat fan-blade, which is fixed with relation thereto and moves therewith in its circular path, and another fan-blade in the form of a loop, which, while on the same arm and moving in the same circular path as the other, revolves on the arm and encircles the other blade. The two forms of blade coöperatively employed on one arm are quite desirable, the loop-blade being well adapted to the scaring of flies, while the other blade is conducive to cooling currents of air.

Another object of my invention is to have the fans operative at various angles, as well as in horizontal planes, and to locate them at various heights without requiring either any change of adjustment or any disturbance of their relations with reference to the central driving-shaft, from which the fan-arms radiate, and to that end I have so organized a vertically-adjustable annular drive-plate and an extensible central driving-shaft that the extensible portion or upper end of the shaft and said plate must move together vertically and carry with them the fans, their drive-wheels, their arms, and the means by which the arms are coupled to said shaft.

After describing the organization illustrated in the drawings the features deemed novel will be duly specified in the several clauses of claim hereunto annexed.

Referring to the drawings, Figure 1 illustrates one of my fans in side elevation. Fig. 2 is a similar view of the central portion of the top of the machine and its standard. Fig. 3 is a view of the same in central vertical section with a portion of the motor at the base. Fig. 4 illustrates a device for stopping the movement of the fans. Fig. 5 illustrates two forms of fan-blade carried on one arm, the outer or loop blade being rotative around the inner blade, which is non-rotative on said arm. Fig. 6 illustrates a flat fan-blade rotatively mounted on its arm and having a drive-wheel at its inner end like the loop-blades in the other figures.

The machine has the usual tubular standard A and hollow base A', containing a spring-motor, having its winding-arbor at $a$. The motor is geared to a square vertical shaft $a'$, located within a vertical tubular shaft $a^2$, the two parts constituting a vertically-extensible shaft, the bottom of the tubular shaft having a square opening occupied by the square shaft, thus rotatively connecting the two. The tubular shaft $a^2$ has its bearing within a tube $b$ and is longitudinally supported and secured therein by means of exterior collars at $b'$ $b'$, the lower collar resting upon an annular surface at the bottom of the tube and the upper collar having an abutment against the under side of a bracket $b^2$, which is carried on top of said tube for supporting the annular drive-plate $c$. The tube $b$ is slidable within the standard A, and the two parts constitute a vertically-extensible standard. The top of the standard A is vertically slitted, as shown, and provided with an external tapered screw-thread at $d$ and an annular thumb-nut $d'$, thus providing an efficient screw-clamp for enabling the drive-plate and the tubular shaft to be readily located and adjusted at any desired height.

The loop-shaped fan-blades B B' instead of being mounted on and driven by revolving shafts, as heretofore, are themselves rotatively mounted on radiating arms $e$ $e$, each loop having a journal-bearing at the outer end of its arm at $e'$, the inner end of the loop being supported upon a drive-wheel $f$, which rests upon the top surface of the drive-plate $c$. These drive-wheels may be loosely journaled on the arms, but friction between the two is wholly obviated by having each wheel provided with a central opening $f'$, which is much larger than the arm, as clearly indicated in Fig. 3. The two fan-arms $e$ $e$ are hinged to a lower cross-head $g$ on the central shaft and adjustably fixed thereto by means of a thumb-screw $g'$, and the arms are further coupled to said shaft by an upper cross-head $h$, having a thumb-screw $h'$ and seated on a shoulder near the top of the shaft and connected with the fan-arms by links $h^2$ $h^2$, thus not only operatively coupling the shaft and the fan-arms, but supporting the arms independently of the drive-wheels and enabling the arms to be located and adjusted for service at various inclinations, if desired. It will be readily understood that when the central shaft is revolved the fans will travel in a circular path and that each blade will in the meantime be axially revolved by its drive-wheel traveling over the annular surface of the drive-plate and that by having the blades rotatively mounted on their arms they are driven with much less power than when, as heretofore, the blades are mounted upon fan-shafts which are axially revolved during the rotation of the central shaft. The frictional contact of the drive-plate with the drive-wheels is ample with light fan-blades, but toothed contact-surfaces may be employed without any departure from my invention. The loop-shaped fan-blades can be and are in some of my machines supplemented by interior flat blades, as shown in Fig. 5, wherein the flat blade C is fixedly mounted upon its fan-arm and is surrounded by the revolving loop-blade B, thus affording cooling currents of air, coupled with the special fly-scaring capacity of the loop-shaped blade. This combination of a fixed blade with the inclosing revolving loop-blade is now rendered possible for the first time because of that feature of my invention by which power is applied for rotating the blade upon its arm instead of, as heretofore, rotating a radial shaft on which the fan-blade is fixedly mounted.

In some cases a flat blade only is desired, in which case it is provided with a drive-wheel at its inner end, as shown in Fig. 6, wherein the flat fan-blade B' has a single journal-bearing on the fan-arm $e$ at its outer end, its drive-wheel $f$ being as before described, thus affording more disturbance of air than the loop-blades, but having a similar fly-scaring capacity, although requiring more driving power.

If the inclination of the fan-arm is to be varied, it will only be necessary to loosen the lower cross-head and reset it at the desired point, and when once adjusted the fan may be located at any desired height without disturbing either cross-head or varying the relations of the several adjacent portions of the machine.

For stopping the fan a catch may be employed, as shown in Fig. 4, wherein the pivoted catch $k$ on the drive-plate $c$ may be either set so that the end of the catch may operate as an abutment for a drive-wheel $f$ or be normally maintained out of the path of the wheels.

Having thus described my invention, I claim as new and desire to secure by Letters Patent—

1. In a fly-fan, the combination with a central vertical driving-shaft, of radial arms hinged to and carried by said shaft, an annular drive-plate below said arms, and fan-blades rotatively mounted on said arms, each blade having at its outer end a journal-bearing on its arm, and having at the inner end a drive-wheel in rotative engagement with the drive-plate, substantially as described.

2. In a fly-fan the combination with a vertical shaft and radial arms hinged thereto, of flat fan-blades each firmly secured to its arm, and loop-shaped fan-blades outside of the flat blades and each rotatively mounted on its arm, and means for causing said loop-blade to revolve around the flat blade, during the rotation of the vertical shaft, substantially as described.

3. In a fly-fan, the combination of a vertical extensible driving-shaft having its extensible portion mounted in and supported by a vertically-adjustable tubular bearing, an annular drive-plate vertically adjustable with said shaft and its bearings, radial arms secured to the upper end of said shaft, and rotative fan-blades journaled at their outer ends upon said arms, and at their inner ends provided with drive-wheels bearing upon the drive-plate, substantially as described, whereby the fan-blades are caused to rotate on their arms while the latter are moving in a circular path due to the rotation of the driving-shaft, and enabling the fan-blades to be located at various heights, without disturbing the connection of their arms with the driving-shaft.

4. In a fly-fan, the combination with a vertical central shaft, an annular drive-plate, a lower cross-head on said shaft provided with a clamp-screw, an upper cross-head resting on a shoulder near the top of said shaft, radial fan-arms hinged to the lower cross-head
5 and coupled to the upper cross-head by links, and fan-blades, each rotatively mounted on its arm, and provided with a drive-wheel in engagement with the drive-plate, substantially as described.

GWYNNE ERNEST PAINTER.

Witnesses:
SAML. D. BRADFORD,
THOS. KELL BRADFORD.